United States Patent [19]

Bernharadt et al.

[11] Patent Number: 4,774,741
[45] Date of Patent: Oct. 4, 1988

[54] METHOD FOR TREATING SLAUGHTERED ANIMALS

[75] Inventors: Douglas H. Bernharadt, Minnetonka; Guillermo R. Matheu, Eden Prairie, both of Minn.

[73] Assignee: Meat Processing Service Corporation, Hopkins, Minn.

[21] Appl. No.: 13,463

[22] Filed: Feb. 11, 1987

[51] Int. Cl.⁴ ............................................. A22C 9/00
[52] U.S. Cl. ........................................ 17/51; 17/1 E; 17/25
[58] Field of Search .................. 17/25, 1 E, 45, 51

[56] References Cited

U.S. PATENT DOCUMENTS

| | | |
|---|---|---|
| 2,812,261 | 11/1957 | Wasserman . |
| 2,863,777 | 12/1958 | Dekker . |
| 3,965,536 | 6/1976 | Osiadacz et al. ................. 17/25 |
| 4,053,963 | 10/1977 | Matheu . |
| 4,221,021 | 9/1980 | Swilley ........................... 17/25 X |
| 4,270,241 | 6/1981 | Braga ............................. 17/1 C |
| 4,275,480 | 6/1981 | Norton et al. ................... 17/25 |
| 4,314,386 | 2/1982 | Easthope et al. ............... 17/25 X |
| 4,358,872 | 11/1982 | Van Zandt ...................... 17/25 X |
| 4,495,676 | 1/1985 | Hartmetz, II .................... 17/25 |
| 4,561,149 | 12/1985 | Nijhuis ............................ 17/25 X |

FOREIGN PATENT DOCUMENTS

| | | |
|---|---|---|
| 573378 | 11/1958 | Canada . |
| 277 | 4/1970 | Guatemala . |
| 519494 | 4/1971 | Guatemala . |
| 2306 | 6/1971 | Guatemala . |
| 208678 | 2/1972 | Guatemala . |
| 231323 | 2/1972 | Guatemala . |
| 112199 | 3/1972 | Guatemala . |
| 424323 | 3/1972 | Guatemala . |
| 1178381 | 9/1985 | U.S.S.R. ........................ 17/1 C |
| 802126 | 10/1958 | United Kingdom . |

OTHER PUBLICATIONS

Abondoned U.S. application Ser. No. 645,309, filed Dec. 29, 1975 entitled Composition and Method for Preparing Meat.
Electrical Stimulation for Improving Meat Quality sponsored by Texas A & M University.
Bibliography of technical papers and grants (Dr. Thayne Dutson).

Primary Examiner—Willie G. Abercrombie
Attorney, Agent, or Firm—Vidas & Arrett

[57] ABSTRACT

Method of injecting treatment solution into slaughtered animals involving electrical stimulation, chilling of the injection solution and use of a self-piercing injection nozzle, among other things.

6 Claims, 1 Drawing Sheet

METHOD FOR TREATING SLAUGHTERED ANIMALS

BACKGROUND AND SUMMARY OF THE INVENTION

The improved method of this invention generally involves the injection of certain liquid compositions into the vascular systems of slaughtered animals e.g., cows, steers, bulls, horses, deer, chicken and other poultry, pigs, and so forth as does the method described in U.S. Pat. No. 4,053,963, which issued on Oct. 18, 1977 and the patents referred to therein, all of which are incorporated herein by reference.

In accordance with the instant invention, one aspect of the improved method involves the application of electrical stimulation to the animal upon its being debled. This has several beneficial effects on all varieties of food animals. It is known to increase the tenderness of the meat among other things, as reported in the study entitled *Electrical Stimulation for Improving Meat Quality*, sponsored by Texas A & M University (TAMU), circa 1978, incorporated herein by reference. However, it has been discovered with respect to the instant invention that electrical stimulation, in combination with the improved injection process, also hastens the circulation of the treatment solution throughout the animal's vascular system in the injection process of this invention. Additionally, it aids in removing the blood from the animal more completely and more rapidly. This shortens the bleeding of the animal from minutes to seconds. It also shortens the time to dehide the animal by minutes. All of this saves plant process time.

Electrical stimulation in combination with the injection process also provides unexpected increases in tenderness and in yield. During its application it may be be applied constantly or intermittently at voltages ranging from about 14 volts to 600 volts, 30 to 40 volts being more typical as reported in the TAMU study identified above.

Instead of introducing the treatment solution through the jugular vein and out the severed hind legs only as described in U.S. Pat. No. 4,053,963, the improved method requires in another of its aspects that all the legs of the slaughtered animals, all four legs in the case of quadrupeds, be severed to allow drainage of the solution from the veins of all four severed legs, i.e., use of all legs as drainage points. Strictly speaking, all that is required is severing of the major blood vessels in all of the legs, not removal of the legs. For example, in a quadruped, one would sever the major veins or vessels in all four legs. However, this is most readily accomplished by simply severing all the legs from the carcass at about the knee joints from a practical standpoint.

Another important effect of utilizing all the legs of the slaughtered animal as drainage points is to make the distribution of the composition more even throughout the meat of the animal.

Another aspect of the inventive method involves use of a cool treatment solution, about 30°-50° F. This "rapid chills" the animal thereby requiring less initial refrigeration time and enhancing the plant's ability to debone and/or butcher the carcass. This allows the plant to debone sooner and saves additional overall plant processing time and it provides a higher yield per animal in the deboning process.

The injection procedure, in another aspect of this invention, has been decontaminated by introducing the use of a self-piercing nozzle tip. The U.S.D.A. has indicated that the method should be made more sterile at this point without increasing processing time. Thus, the earlier technique involving the use of a knife to incise the animal's hide, remove the membrane sheath around the jugular and then slit the jugular, followed by insertion of a blunt nozzle tip for introduction of the treatment solution is no longer desirable. The improved technique, using a self-piercing nozzle tip, solves the contamination problem and additionally saves more plant time, about ½ minute per animal in the case of beef, for example. The new nozzle simply pierces the sheath and the vein.

DETAILED DESCRIPTION OF THE PREFERRED EMBODIMENT

Figure 1:
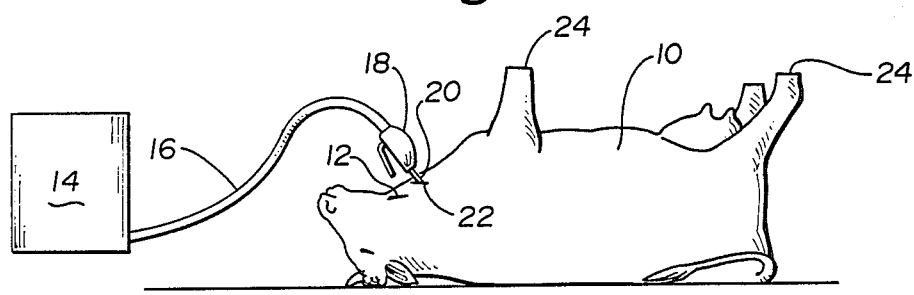
FIG. 1 is a schematic showing of a beef carcass undergoing treatment according to the invention.

The improved method of the invention comprises an integral part of the slaughtering process in which an animal, such as a beef, is first typically stunned by a blow to the head with a "knocker" and an incision is made in the jugular vein in the neck, as is indicated on animal 10 at 12 in FIG. 1. The slaughtered animal 10 may be any of the wide variety of food animals, including steer, cows, deer, chickens, hogs, buffaloes and the like, typically encountered. In the case of poultry, such animals are infused with a multiple needle injection (never cardiovascularly) or simply bathed in the composition solution, typically for 1¼ hours. Beef is specifically referred to herein collectively for cows, steers and so on as they are most typically encountered as food animals and represent a preferred embodiment of this invention.

Normally, incision 12 allows bleeding of the animal and is responsible for its death. However, as a part of this invention, electrical stimulation is applied to the animal at this point in slaughtering for the various purposes already described. It is best applied by attaching an electrical clamp, such as an alligator clamp or the like into the incision at 12 or to the animal's nose. The ground is furnished by attaching a chain to the animal's legs. Usually, the chain used to hang the animal to a rail, which is grounded, is satisfactory for this purpose.

The source of electrical energy may be one of the commercially available electrical stimulators. Such stimulators provide a square wave form current at voltages from about 14 to 600 volts, 30 to 40 being typically used. Preferably stimulation will be applied ranging from a substantially constant sustained pulse of about 14 seconds to about 20 pulses over about 30 seconds.

In the meantime a quantity of injection solution is prepared in a tank (not shown) which is part of module 14. Module 14 may comprise an apparatus of the type described in U.S. Pat. No. 4,053,963 or the like (preferably of complete stainless steel construction) which includes a tank, pump and appropriate plumbing to provide a flow of injection solution through conduit 16, valve 18 and nozzle 20 at a relatively constant predetermined pressure, typically 45 to 60 pounds, when nozzle 20 has been inserted into a second incision 22 in the jugular vein of the slaughtered animal 10 and valve 18 is opened. A preferred apparatus for this purpose is described in copending application entitled Apparatus for Treating Slaughtered Animals, filed on even date herewith.

The injection solution is prepared in such a manner that it has a temperature below ambient and is somewhat cool. Temperature is preferably in the 30°–50° F. range. This may be accomplished by preparing the injection solution with cool or cold water or the solution may be cooled in the tank of module 14 by any suitable means such as a cooling jacket placed around the tank and through which a refrigerant is circulated.

In preparing the animal for injection, in addition to the second incision 22, all of the animals legs should be severed at the knee joints as indicated at 24. Strictly speaking, only major vessels need be severed in each leg but severing of the entire leg is most practical for purposes of the invention. This not only facilitates bleeding of the animal but provides visual confirmation and assurance that the injection solution has rapidly coursed throughout the animal upon observing its passing out of the severed legs and out of incision 12.

It is to be noted that incision 22 which is used as the injection site is placed closer to the heart than incision 12. Nozzle 20 is inserted into the vein pointed in the same direction as that of the natural blood flow therein. This is done to take advantage of the unidirectional flow of the circulatory system when the venous system is used for bleeding and solution injection. If the arterial system were used, the relationship of the two incisions and the direction of the inserted nozzle would have to be reversed. Since the arterial system is generally less accessible, the use of the venous system is preferred herein.

Although a knife or the like is used for making incision 12, this does not present a contamination problem due to the outflow of blood from the incision. However, since incision 22 is utilized for introducing injection solution into the body of the slaughtered animal, the USDA has objected to the use of the same knife in making incision 22 and for slitting the blood vessel. As a consequence, the method of the invention provides an improved injection nozzle designed to be self-piercing.

Figure 2:
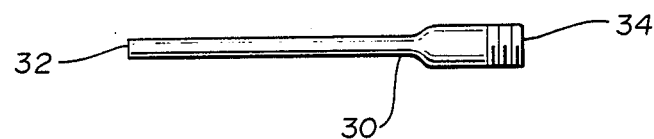
FIG. 2 is a showing of a prior art injection nozzle.
Figure 3:
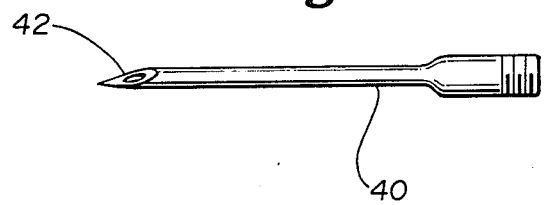
FIG. 3 is a showing of an improved injection nozzle according to the invention.

Reference to FIG. 2 shows the prior art injection nozzle 30 which has a blunt tip 32. Previously, after formation of incision 22, a knife was used to slit the vessel, then tip 32 was inserted into the vessel and solution was injected through the nozzle from conduit 16 connected to the nozzle at 34. Reference to FIG. 3 shows the improved nozzle 40 of the invention which includes a sharp self-piercing tip 42. With this nozzle, incision 22 is made as before. However, the vein need not be slit with a knife since tip 42 may be simply inserted into the vessel, piercing it as it enters. The operator then opens valve 18 and the injection procedure is completed after which the valve is closed and the nozzle is removed.

Within the purview of this invention, any appropriate injection solution or composition may be utilized other than that referred to in U.S. Pat. No. 4,053,963. Other embodiments of the apparatus described therein will occur to others as well as will variations in the method described herein. In determining the scope of the invention, reference should be made to the following claims.

What is claimed is:

1. In a method involving injection of treatment solution into the vascular system of a slaughtered animal, the improvement comprising severing the major vessels in all legs of the animal, the application of electrical stimulation to the animal substantially immediately upon bleeding it and the injection of cooled treatment solution at a pressure of at least about 45 pounds, all substantially simultaneously.

2. The method of claim 1 wherein the electrical stimulation is applied as a series of intermittent impulses.

3. The method of claim 2 wherein the voltage ranged from about 30 to about 40.

4. The method of claim 3 wherein the number of electrical impulses ranges from a single substantially constant sustained pulse of about 14 seconds to about 20 pulses over about 30 seconds.

5. The method of claim 1 wherein the cooling temperature is in about the 30°–50° F. range.

6. The method of claim 1 wherein the injection nozzle for introducing treatment solution includes a self-piercing tip.

* * * * *

UNITED STATES PATENT AND TRADEMARK OFFICE
CERTIFICATE OF CORRECTION

PATENT NO. : 4,774,741

DATED : October 4, 1988

INVENTOR(S) : Bernhardt et al.

It is certified that error appears in the above-identified patent and that said Letters Patent is hereby corrected as shown below:

ON THE TITLE PAGE:

Inventor's name appearing as "Bernharadt" should read --"Bernhardt"--.

Signed and Sealed this

Fourteenth Day of February, 1989

Attest:

DONALD J. QUIGG

*Attesting Officer*  *Commissioner of Patents and Trademarks*